United States Patent
Ueyoko et al.

(10) Patent No.: US 7,360,571 B2
(45) Date of Patent: Apr. 22, 2008

(54) PNEUMATIC TIRE WITH COMPOSITE BELT STRUCTURE

(75) Inventors: Kiyoshi Ueyoko, Fairlawn, OH (US); John Joseph Slivka, Danville, VA (US); Roel Domingo Villanueva, Hudson, OH (US); Robert John Boehlefeld, Brecksville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 211 days.

(21) Appl. No.: 10/663,637

(22) Filed: Sep. 16, 2003

(65) Prior Publication Data

US 2005/0056359 A1 Mar. 17, 2005

(51) Int. Cl.
*B60C 9/22* (2006.01)
*B60C 9/18* (2006.01)

(52) U.S. Cl. ........................ 152/531; 152/533
(58) Field of Classification Search ........... 152/531, 152/533; 156/117
See application file for complete search history.

(56) References Cited

U.S. PATENT DOCUMENTS

| | | | |
|---|---|---|---|
| 3,608,605 A | 9/1971 | Cole | |
| 4,838,966 A * | 6/1989 | Oswald | 156/117 |
| 5,205,881 A | 4/1993 | Kohno et al. | |
| 5,223,061 A | 6/1993 | Navaux | |
| 5,271,445 A | 12/1993 | Kohno et al. | |
| 5,385,190 A | 1/1995 | Assaad et al. | |
| 5,427,167 A | 6/1995 | Watanabe et al. | |
| 5,513,685 A | 5/1996 | Watanabe et al. | |
| 5,535,801 A | 7/1996 | Iseki et al. | |
| 5,593,523 A | 1/1997 | Suzuki et al. | |
| 5,683,543 A | 11/1997 | Morikawa et al. | |
| 5,730,814 A | 3/1998 | Morikawa et al. | |
| 6,058,997 A | 5/2000 | Nishida et al. | |
| 6,098,683 A | 8/2000 | Nakano | |
| 6,116,311 A * | 9/2000 | Ueyoko et al. | 152/531 |
| 6,125,900 A | 10/2000 | De Loze de Plaisance | |
| 6,374,890 B1 | 4/2002 | Nakano | |
| 6,520,232 B1 | 2/2003 | Miyazaki et al. | |
| 2002/0005239 A1* | 1/2002 | Royer et al. | |
| 2004/0163748 A1* | 8/2004 | Ueyoko | 152/531 |

FOREIGN PATENT DOCUMENTS

| | | |
|---|---|---|
| EP | 0 501 782 A2 | 9/1992 |
| JP | 5-270211 | 10/1993 |
| JP | 8-156513 A2 | 6/1996 |
| JP | 2001-71797 | 3/2001 |
| JP | 2002211208 A * | 7/2002 |

* cited by examiner

*Primary Examiner*—Adrienne C. Johnstone
(74) *Attorney, Agent, or Firm*—June E. Rickey; David L. King

(57) ABSTRACT

A method of forming a composite belt structure for a tire is disclosed. The composite belt structure has cord reinforced layers including at least two radially outer zigzag belt layers. The cords per inch in the shoulder portion are greater than the cords per inch in the central portion as measured centered on the centerplane of the belt structure. The method discloses the steps of applying a multicord reinforced strip having a strip width SW onto a rotating crowned building drum, the strip being wound in a zigzag configuration to form at least two zigzag layers, wherein the crowned drum has non-overlapping portions of the strip placed in a central portion and extending in alternation to a pair of shoulder portions having portions of the strips overlapping to form belt layers.

6 Claims, 9 Drawing Sheets

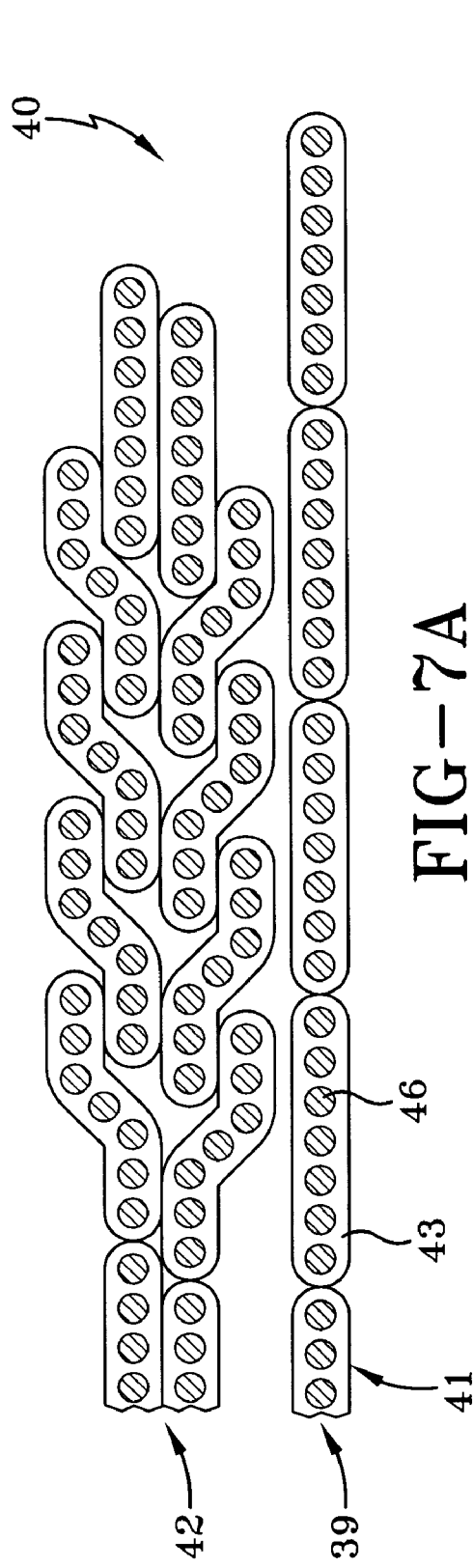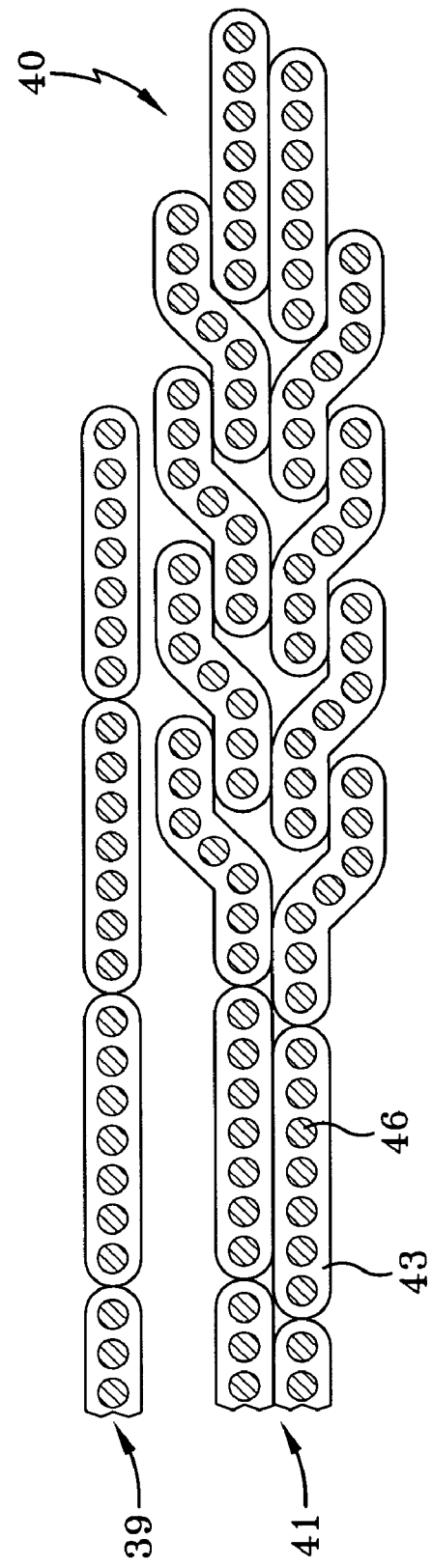

PNEUMATIC TIRE WITH COMPOSITE BELT STRUCTURE

FIELD OF THE INVENTION

This invention relates to pneumatic tires having a carcass and a belt reinforcing structure, more particularly to high speed heavy load radial ply tires such as those used on aircraft.

BACKGROUND OF THE INVENTION

Pneumatic tires for high speed applications experience a high degree of flexure in the crown area of the tire as the tire enters and leaves the contact patch. This problem is particularly exacerbated on aircraft tires wherein the tires can reach speed of over 200 mph at takeoff and landing.

When a tire spins at very high speeds the crown area tends to grow in dimension due to the high angular accelerations and velocity tending to pull the tread area radially outwardly. Counteracting these forces is the load of the vehicle which is only supported in the small area of the tire known as the contact patch.

In U.S. Pat. No. 5,427,167, Jun Watanabe of Bridgestone Corporation suggested that the use of a large number of belt plies piled on top of one another was prone to cracks inside the belt layers which tended to grow outwardly causing a cut peel off and scattering of the belt and the tread during running. Therefore, such a belt ply is not used for airplanes. Watanabe found that zigzag belt layers could be piled onto the radially inner belt layers if the cord angles progressively increased from the inner belt layers toward the outer belt layers. In other words the radially inner belt plies contained cords extending substantially in a zigzag path at a cord angle A of 5 degrees to 15 degrees in the circumferential direction with respect to the equatorial plane while being bent at both sides or lateral edges of the ply. Each of the outer belt plies contains cords having a cord angle B larger than the cord angle A of the radially inner belt plies.

In one embodiment each of the side end portions between adjoining two inner belt plies is provided with a further extra laminated portion of the strip continuously extending in the circumferential direction and if the radially inner belt plies have four or more in number then these extra laminated portions are piled one upon another in the radial direction. The inventor Watanabe noted the circumferential rigidity in the vicinity of the side end of each ply or the tread end can be locally increased so that the radial growth in the vicinity of the tread end portion during running at high speed can be reduced.

SUMMARY OF THE INVENTION

The method of forming a composite belt structure for a tire is disclosed. The method discloses the steps of applying a multicord reinforced strip having a strip width $S_W$ onto a rotating crowned building drum, the strips being wound in a zigzag configuration to form at least two zigzag layers wherein the crowned drum has non-overlapping portions of the strips placed in a central portion and extending in alternation to a pair of shoulder portions having portions of the strips overlapping, the central portion having a maximum diameter $D_o$ and the shoulder portions have a minimum diameter $D_i$, the adjacent strips being placed apart from 0 to 2 mm in the central portion and the strips are increasingly overlapping in each shoulder portion as the strips extend from the central portion toward lateral ends of the belt structure to form belt layers of a composite belt structure having the cords per inch in the shoulder portion as measured axially inwardly from the axially inner edge of the strip adjacent the lateral ends of the narrowest radially outer belt layer radially inwardly greater than the cords per inch in the central portion as measured centered on the centerplane of the belt structure.

Preferably the strips in the non-overlapping center region occupy at least 50% of the belt width and each overlapping shoulder portion occupies 25% or less of the belt width W, W being measured at the lateral extremes or edges of the widest belt layer. The overlapping of strips in each shoulder portion ranges from greater than 0% adjacent the central portion up to 100% at the outermost lateral edge of the respective belt layer. Preferably the overlap of each adjacent zigzag strip adjacent to a turning point at the lateral edge overlaps at a distance of 50% or more of the strip width $S_W$.

The resultant method produces a pneumatic tire having a tread, a carcass and a belt reinforcing structure, the belt reinforcing structure having a composite belt structure of cord reinforced layers including at least two radially inner zigzag belt layers, each outer zigzag belt layer having cords inclined at 5 to 30 degrees relative to the centerplane of the tire extending in alternation to turnaround points at each lateral edge, and at least one spirally wound belt layer having cords wound spirally at an inclination of 5 degrees or less relative to the tire's centerplane and located radially outward of the at least two radially inner zigzag belt layers, and the distance between the lateral edges of the widest belt layer defines the belt width W, and wherein each zigzag belt layer is formed by a continuous strip of two or up to 20 cords, the strips having edges spaced apart a distance of 0 to 2 mm in a central portion occupying at least 50% of the belt width W and in each shoulder portion occupying 25% or less of W the edges of the adjacent strips within a layer are overlapping to form a belt having the cords per inch greater in the shoulder portions than the central portion. The overlapping of the adjacent strips in each zigzag layer ranges from greater than 0% of the strip width $S_W$ to 100%.

The preferred the belt reinforcing structure in addition to two radially inner zigzag layers has at least two radially outer zigzag layers and at least one spiral wound belt layer, the radially inner zigzag belt layers being positioned between the carcass and the at least one spiral wound belt layer and the radially outer zigzag layer being between the tread and the at least one spiral wound layer, each radially inner and radially outer zigzag belt layer having cords wound in alternation at an inclination of 5 degrees to 30 degrees relative to the centerplane of the tire to turnaround points at each lateral edge of the belt layer.

One embodiment of the invention has at least five belt layers, two radially inner zigzag belt layers, one or more spirally wound belt layers, preferably three or more, and two radially outer zigzag belt layers. In another alternative embodiment the spiral wound layer can be positioned radially inward of at least one zigzag belt layer.

Each of the resultant belt structures has X cords per inch as measured in the central portion centered on the centerplane in an area $W_C$ measuring one inch axially, and at a location in the shoulder portion at the axially inner edge of the strips adjacent the lateral end of the narrowest belt layer in an area $W_S$ measuring one inch wide axially inwardly extending, the cords per inch in the area defined $W_S$ being 101% to 200% times the cords per inch X in the area defined by $W_C$.

Definitions

"Apex" means a non-reinforced elastomer positioned radially above a bead core.

"Aspect ratio" of the tire means the ratio of its section height (SH) to its section width (SW) multiplied by 100% for expression as a percentage.

"Axial" and "axially" mean lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Cut belt or cut breaker reinforcing structure" means at least two cut layers of plies of parallel cords, woven or unwoven, underlying the tread, unanchored to the bead, and having both left and right cord angles in the range from 10 degrees to 33 degrees with respect to the equatorial plane of the tire.

"Bias ply tire" means a tire having a carcass with reinforcing cords in the carcass ply extending diagonally across the tire from bead core to bead core at about a 25°-50° angle with respect to the equatorial plane of the tire. Cords run at opposite angles in alternate layers.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Chafers" refer to narrow strips of material placed around the outside of the bead to protect cord plies from the rim, distribute flexing above the rim, and to seal the tire.

"Chippers" mean a reinforcement structure located in the bead portion of the tire.

"Cord" means one of the reinforcement strands of which the plies in the tire are comprised.

"Equatorial plane (EP)" means the plane perpendicular to the tire's axis of rotation and passing through the center of its tread.

"Flipper" means a reinforced fabric wrapped about the bead core and apex.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Net-to-gross ratio" means the ratio of the tire tread rubber that makes contact with the road surface while in the footprint, divided by the area of the tread in the footprint, including non-contacting portions such as grooves.

"Nominal rim diameter" means the average diameter of the rim flange at the location where the bead portion of the tire seats.

"Normal inflation pressure" refers to the specific design inflation pressure and load assigned by the appropriate standards organization for the service condition for the tire.

"Normal load" refers to the specific design inflation pressure and load assigned by the appropriate standards organization for the service condition for the tire.

"Ply" means a continuous layer of rubber-coated parallel cords.

"Radial" and "radially" mean directions radially toward or away from the axis of rotation of the tire.

"Radial-ply tire" means a belted or circumferentially-restricted pneumatic tire in which the ply cords which extend from bead to bead are laid at cord angles between 65° and 90° with respect to the equatorial plane of the tire.

"Section height" (SH) means the radial distance from the nominal rim diameter to the outer diameter of the tire at its equatorial plane.

"Zigzag belt reinforcing structure" means at least two layers of cords or a ribbon of parallel cords having 2 to 20 cords in each ribbon and laid up in an alternating pattern extending at an angle between 5° and 30° between lateral edges of the belt layers.

BRIEF DESCRIPTION OF THE DRAWINGS

FIGS. 7A and 7B are schematically enlarged section views of the composite belt layers in the vicinity of side end portions of the belt structure, one showing the spiral layer radially inward of a zigzag belt layer and the other showing the spiral belt layer radially outward of the zigzag belt layer;

DETAILED DESCRIPTION OF THE INVENTION

Figure 1:
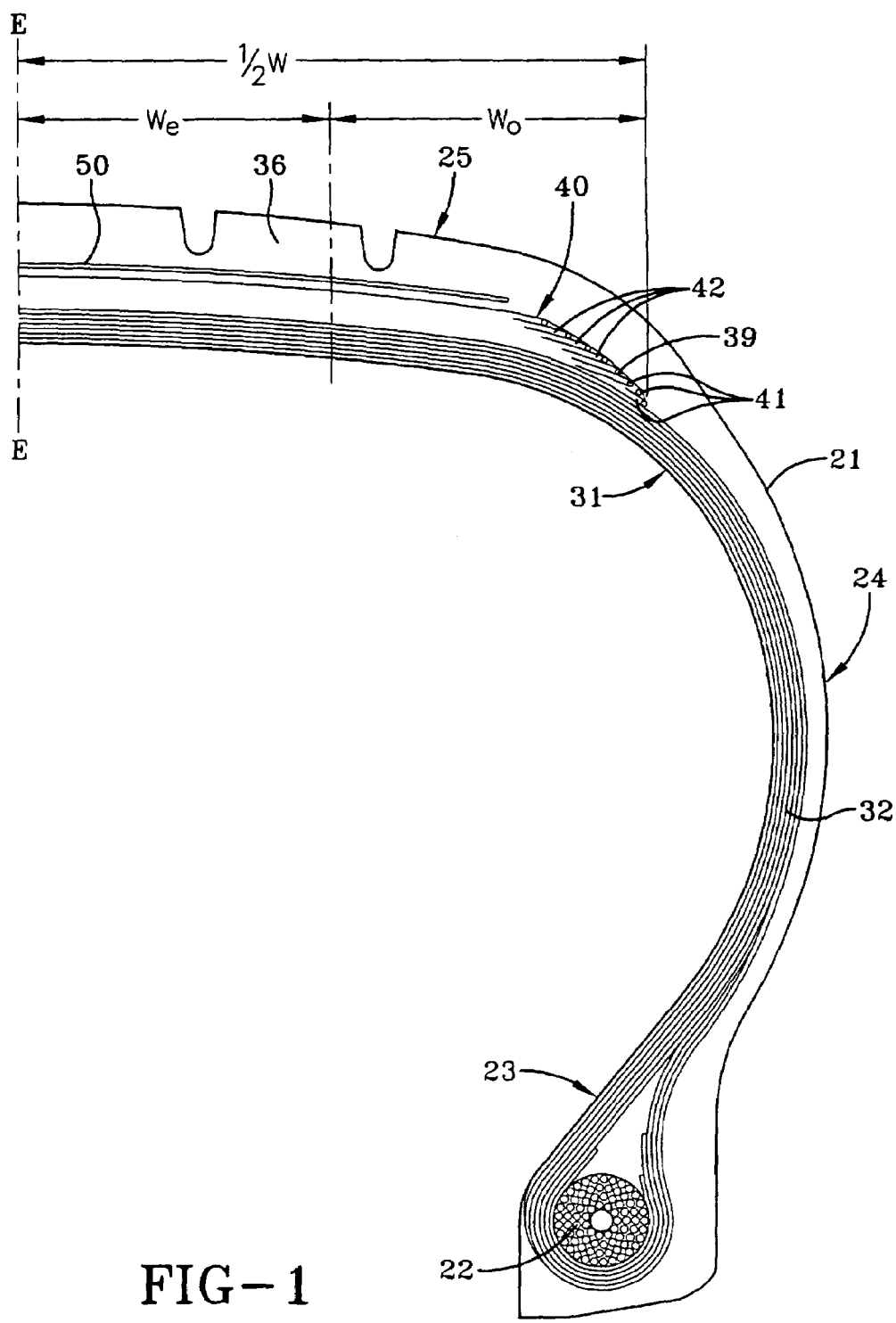
FIG. 1 us a cross sectional view of one-half of a first embodiment of the tire according to the invention.
Figure 2:
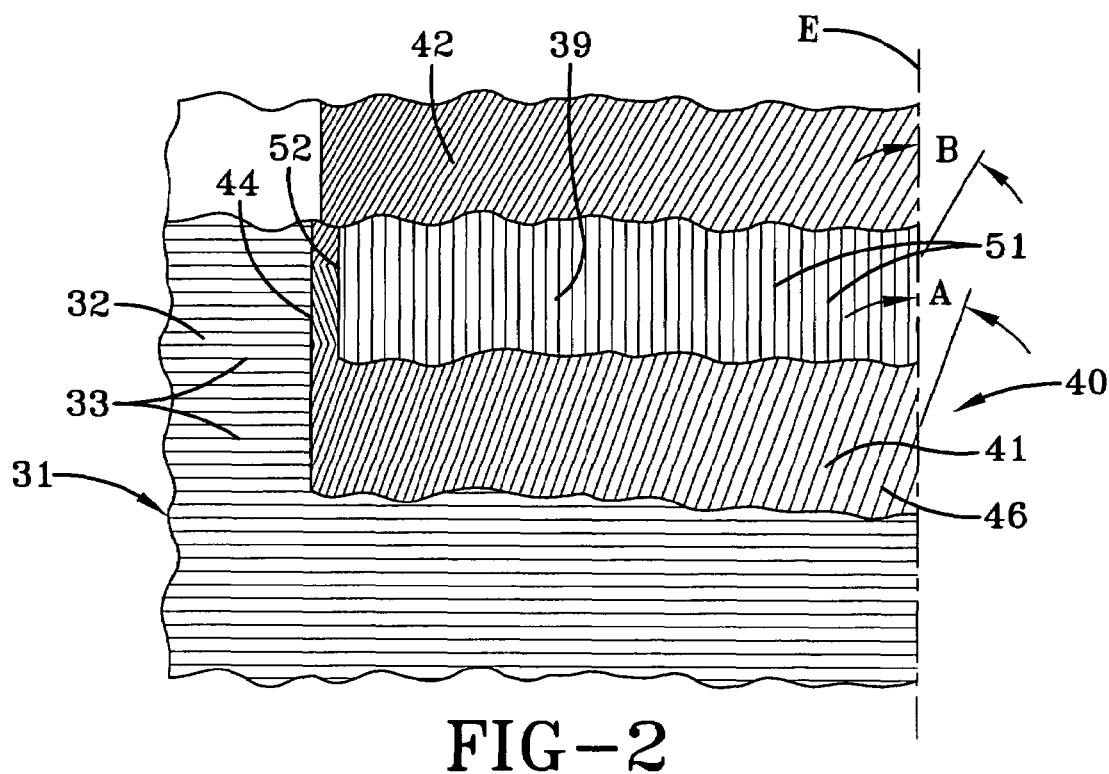
FIG. 2 is a partially cutaway top view of the tire shown in FIG. 1.

In FIGS. 1 and 2, numeral 21 is a radial tire of the preferred embodiment of the invention, as shown, to be mounted onto an airplane, which comprises a pair of bead portions 23 each containing a bead core 22 embedded therein, a sidewall portion 24 extending substantially outward from each of the bead portions 23 in the radial direction of the tire, and a tread portion 25 of substantially cylindrical shape extending between radially outer ends of these sidewall portions 24. Furthermore, the tire 21 is reinforced with a carcass 31 toroidially extending from one of the bead portions 23 to the other bead portion 23. The carcass 31 is comprised of at least two carcass plies 32, e.g. six carcass plies 32 in the illustrated embodiment. Among these carcass plies 32, four inner plies are wound around the bead core 22 from inside of the tire toward outside thereof to form turnup portions, while two outer plies are extended downward to the bead core 22 along the outside of the turnup portion of the inner carcass ply 32. Each of these carcass plies 32 contains many nylon cords 33 such as nylon-6,6 cords extending substantially perpendicular to an equatorial plane E of the tire (i.e. extending in the radial direction of the tire). A tread rubber 36 is arranged on the outside of the carcass 31 in the radial direction.

Figure 3:
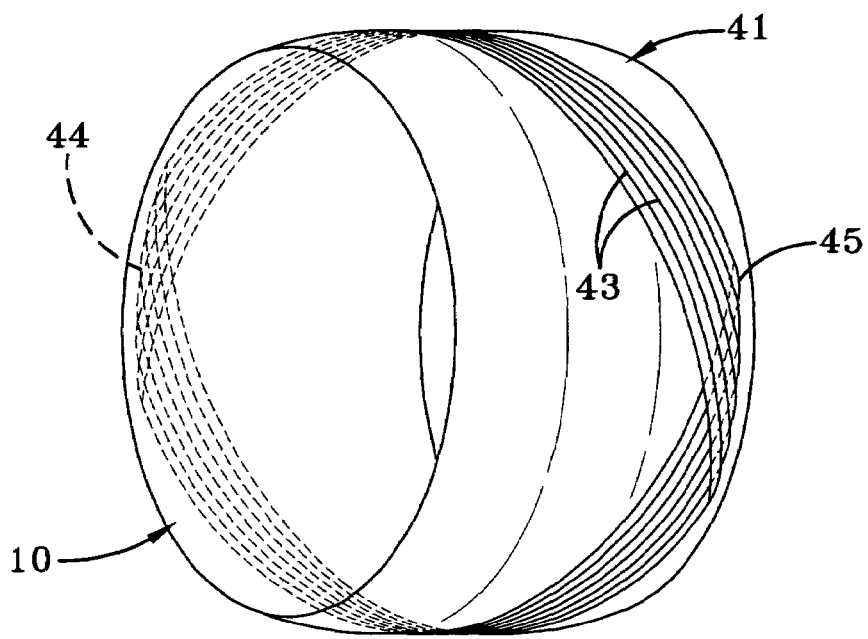
FIG. 3 is a schematically perspective view of an inner or outer zigzag belt layer in the middle of the formation on the crowned building drum.
Figure 4:
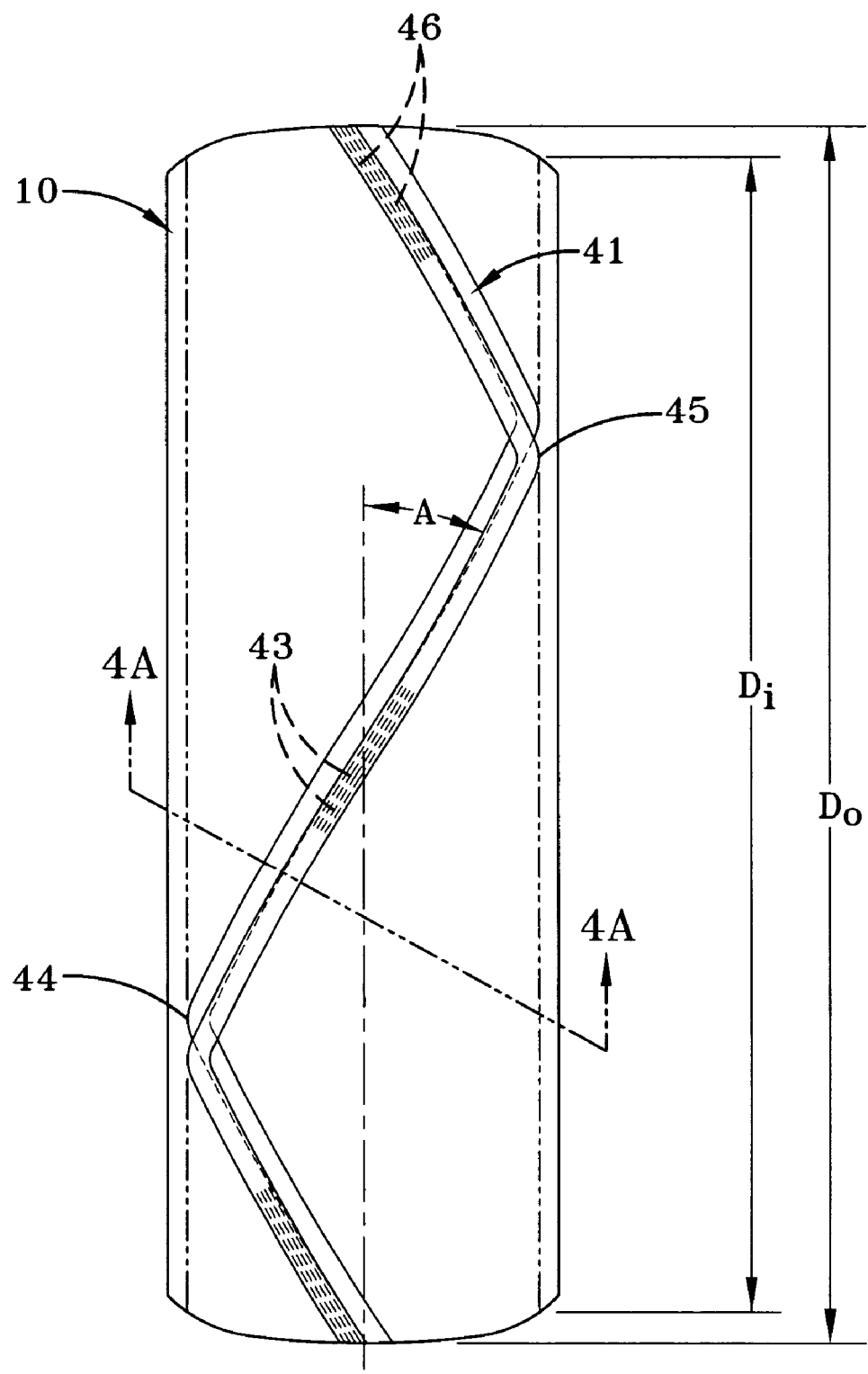
FIG. 4 is a schematically developed view of the inner or outer zigzag belt layers on the building drum in the start of the formation and FIG. 4A is a cross section view of the first zigzag belt layer formed on the building drum.
Figure 4A:
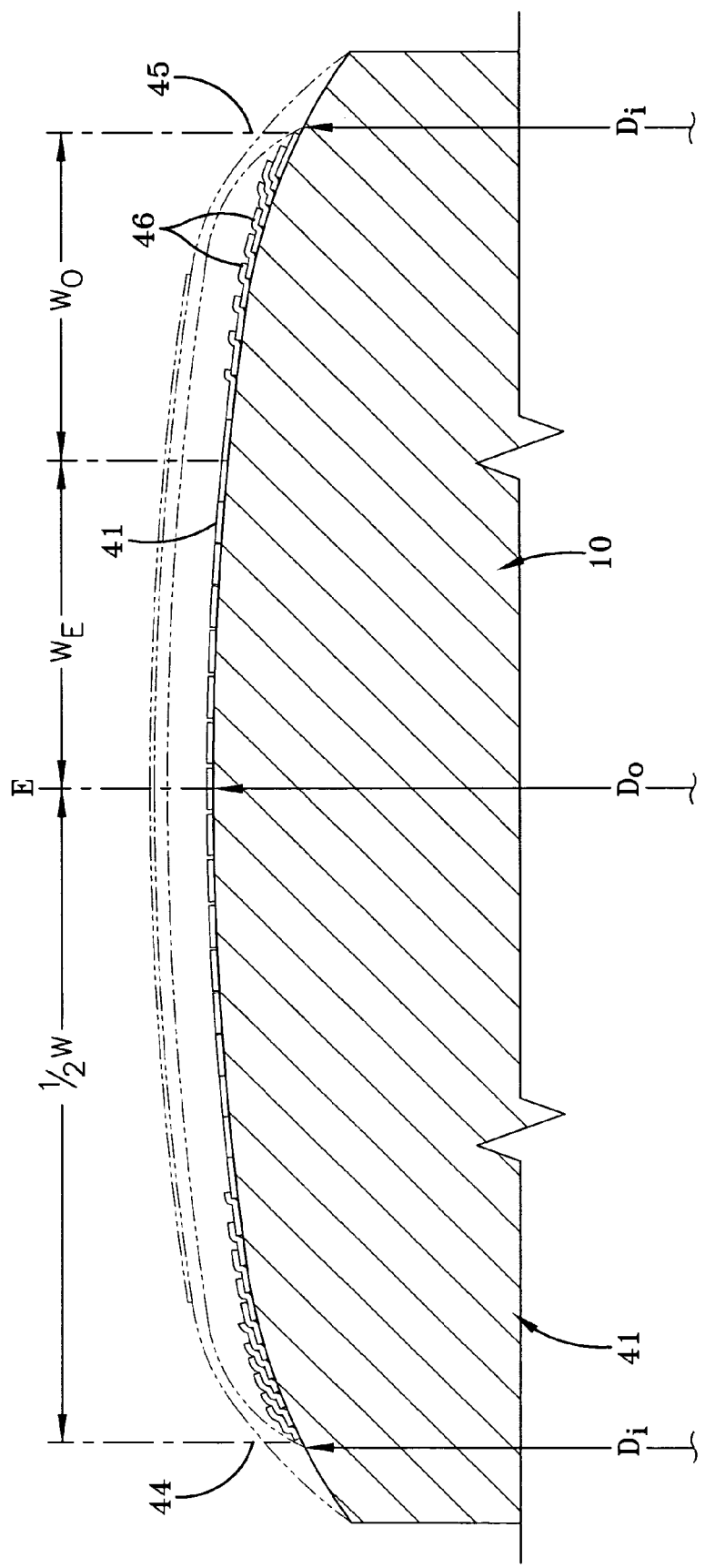
Figure 8:
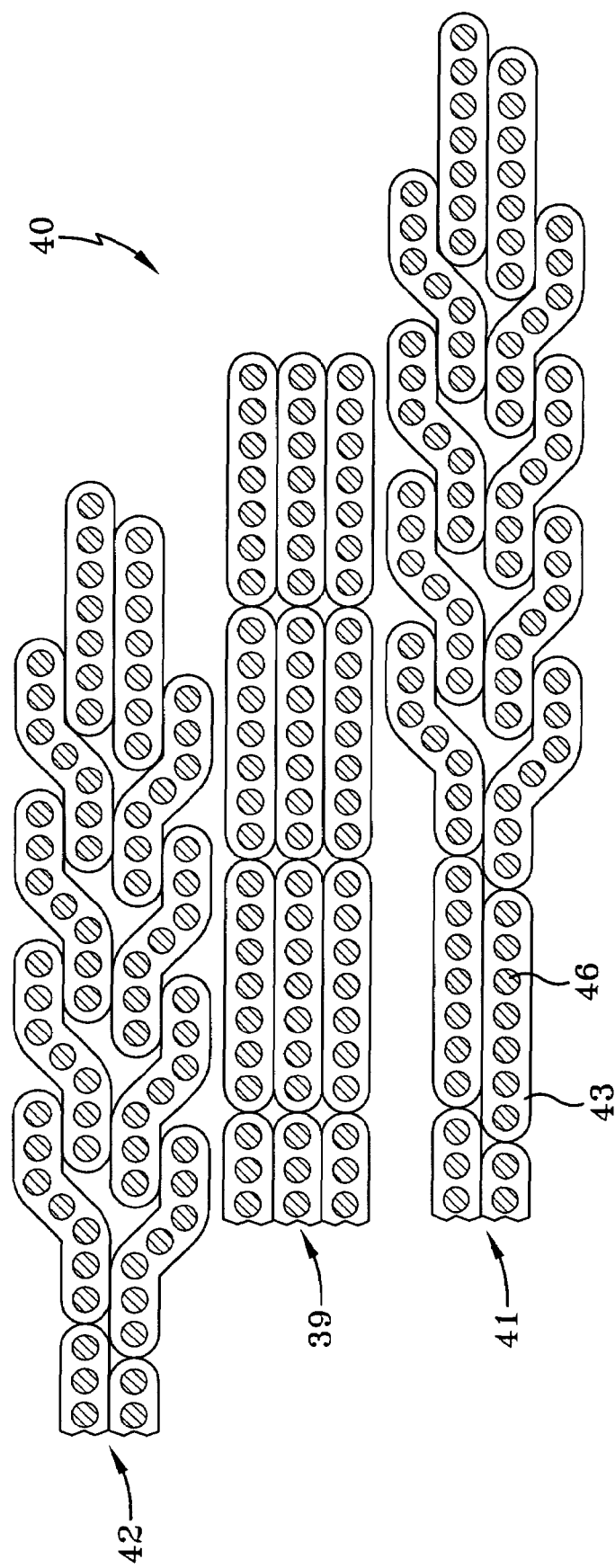
FIG. 8 is a schematically developed view of the preferred composite belt structure located at an outermost side.

In FIG. 1 a belt 40 is shown arranged between the carcass 31 and the tread rubber 36 as a region having an upper boundary line having a plurality of layers 39, 41, 42 which are shown only in the right side of the figure for clarity, and is comprised of plural inner belt plies or layers 41 located near the carcass 31, i.e. two radially inner belt layers 41 in the illustrated embodiment and plural radially outer belt layers 42 located near to the tread rubber 36, i.e. two radially outer belt layers 42 in the illustrated embodiment. As shown in FIGS. 3 and 8, each of the radially inner belt plies 41 is formed by providing a rubberized strip 43 of two or more cords 46, winding the strip 43 generally onto a crowned building drum in the circumferential direction while being inclined to extend between side ends or lateral edges 44 and 45 of the layer forming a zigzag path and conducting such a winding many times while the strip 43 is shifted at approximately a width equal to or greater than the strip width $W_S$ in the circumferential direction so as to form a gap ranging from 0 to 2 mm between the adjoining strips 43 in a central portion occupying about 50% or more of the total belt width W. Thereafter, the strips overlap an adjacent strip of the respective belt layer in each shoulder portion, the overlap being slightly greater than 0% to 100% increasing as the strip extends from the central portion toward the lateral end of the respective belt layer. Each shoulder portion extends 25% or less of the total belt width W. As a result, the cords 46 extend substantially zigzag in the circumferential direction while changing the bending direction at a turnaround point at both ends 44, 45 and are substantially uniformly embedded in the first inner belt layer 41 over the central portion of the first inner belt layer 41 and in the overlapping shoulder portion having an increasing cord density in each shoulder portion. Moreover, it is intended to form the radially inner belt layer 41 by the above method, the cords 46 lie one upon another, so that two, first and second inner belt layers 41 are formed while crossing the cords 46 of these plies with each other. Similarly the radially outer belt layers 42 are made using the same method. Interposed between the inner layers 41 and outer layers 42 is at least one spirally wound layer 39 of cords 46, the cords being wound at an angle of plus or minus 5 degrees or less relative to the circumferential direction.

Figure 9:
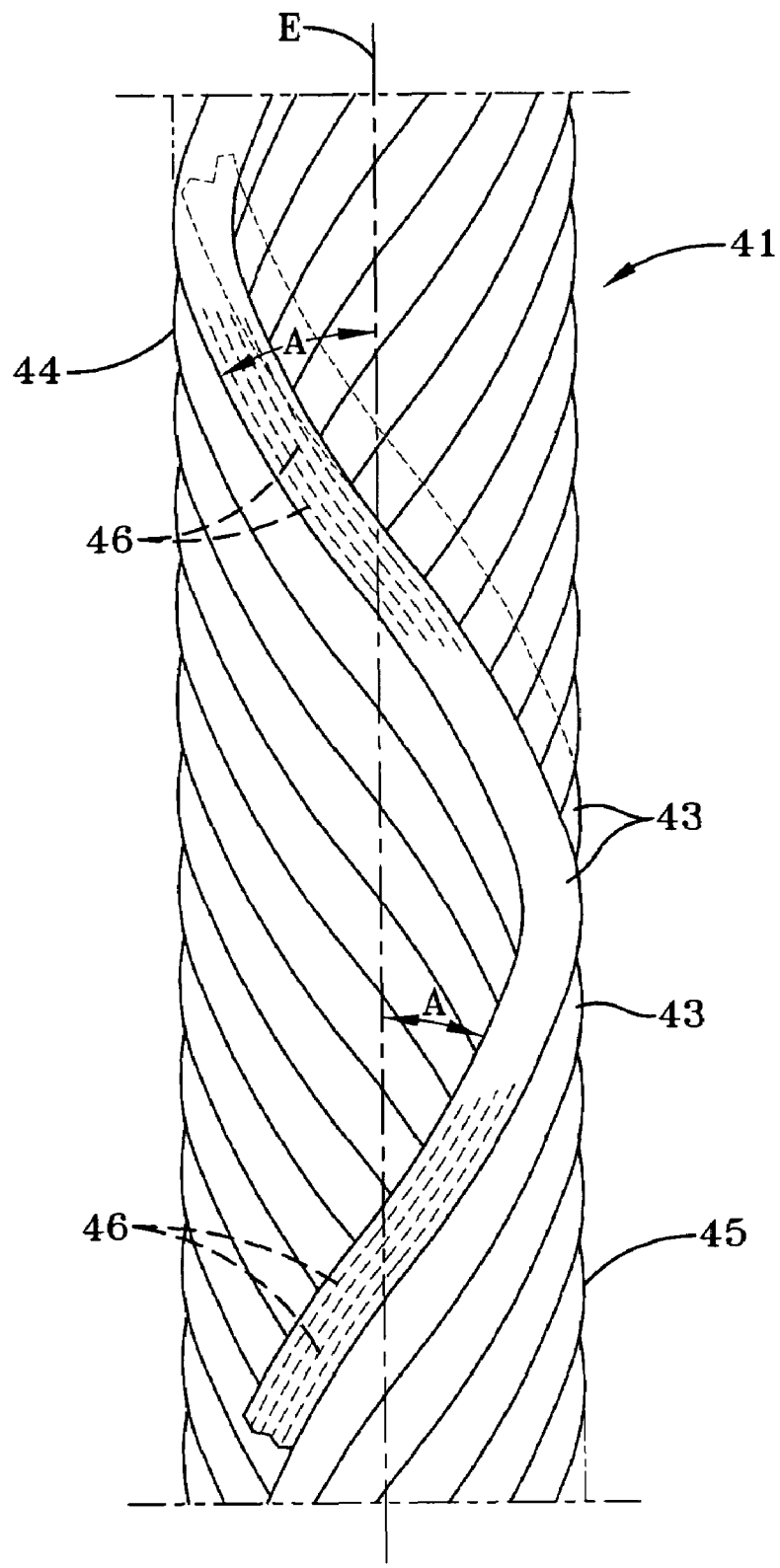
FIG. 9 is a plan view of a portion of the composite zigzag belt layers wherein the dashed lines depict the increasing overlap of each of the strips 43 as it approaches a lateral edge.

In the pneumatic radial tire for airplanes, there are various sizes, the tire illustrated is a 42×17.0R18 with a 26 ply rating and the tire 21 has the belt composite reinforcing structure as shown in FIG. 9. As shown the tire of FIG. 9 has two inner zigzag layers 41 and three spiral layers 39 and two outer zigzag layers 42.

As illustrated, the overall total belt width W from the lateral edges of the radially inner zigzag belt layer is about 320 mm. The central portion is about 50% W while each shoulder portion is 25% W. As shown, the total belt thickness of the central portion (excluding the overlay) is 8.5 mm. This thickness is reflective of the non-overlapping strips in the zigzag layers 41, 42 in the shoulder portions where the strips overlap in the zigzag belt layers 41, 42. Thus the two belt layers increasingly overlap and go from 2.0 adjacent the central portion to greater than 2 to three strips to four strips at the turnaround locations. Conventional zigzag layers go from two layers to three at the turnaround locations. Thus the cord density in ends per inch is far less in a cylindrical flat built abutting strip method of forming zigzag layers. The present invention tire of FIG. 9 has 110 cords per inch at the centerplane of the belt structure and adjacent the turnaround location as measured axially inwardly in each shoulder portion the cord density is 150 cords per inch. In any such tire size, the cords 46 of the inner belt plies 41 cross with each other at a cord angle A of 5 degrees to 15 degrees with respect to the equatorial plane of the tire when the strip 43 is reciprocated at least once between both side ends 44 and 45 of the ply within every 360 degrees of the circumference as mentioned above. Typically the alteration occurs multiple times enabling the cord angles to typically fall in the 15° to 30° range for zigzag belts.

Figure 5:
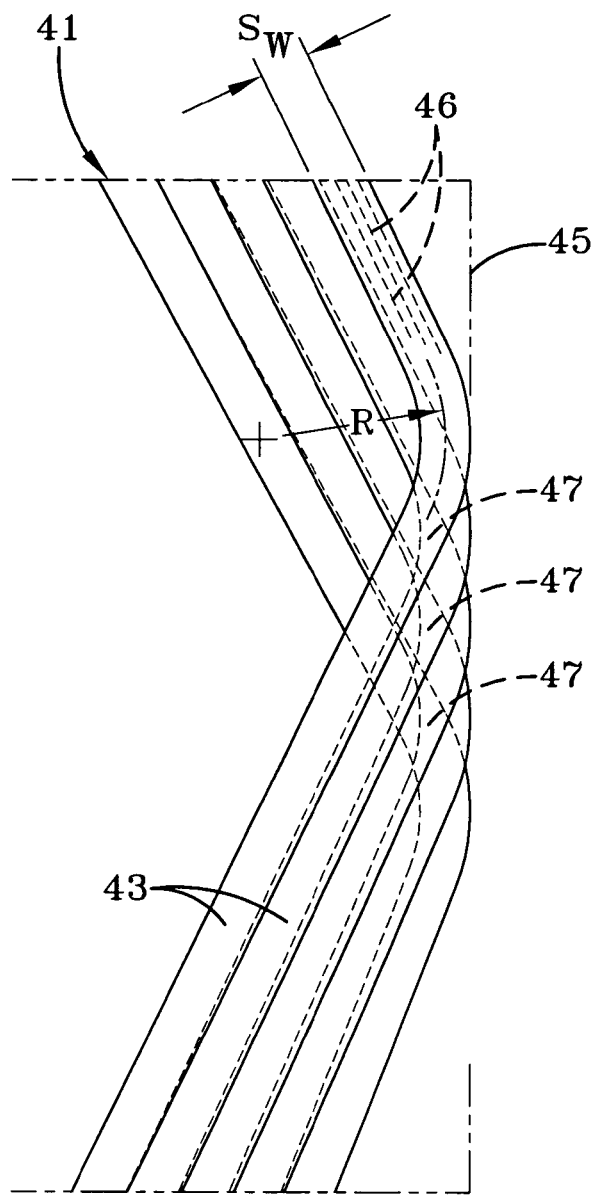
FIG. 5 is an enlargedly developed view of the inner or outer zigzag belt layers in the vicinity of the side end of the belt layer in the start of the formation.
Figure 6:
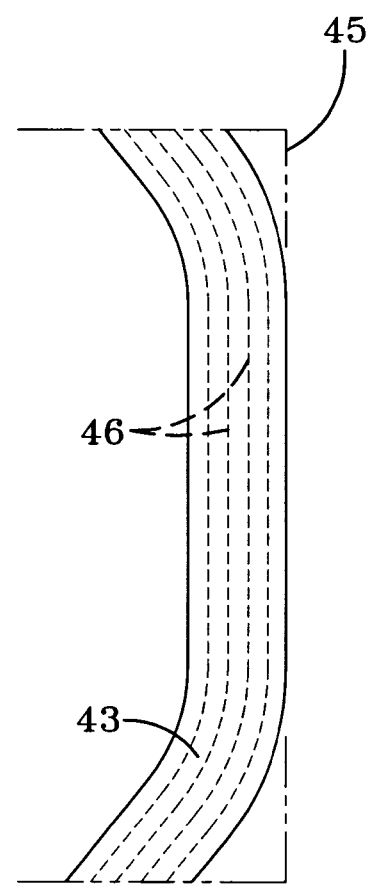
FIG. 6 is an enlargedly developed view of another embodiment of the inner belt layer in the vicinity of the side end of the belt layer in the middle of the formation.

In the illustrated embodiment, the widths of the inner belt layers 41 become narrower as the belt 40 is formed outward in the radial direction or approaches toward the tread rubber 36. Further, when the inner belt layers 41 is formed by winding the rubberized strip 43 containing plural cords 46 arranged in parallel with each other as mentioned above, a period for forming the belt layer 41 can be shortened and also the cord 46 inclination can be made larger or smaller as desired. However, the strip 43 is bent at the side ends 44, 45 of the belt layers with a small radius of curvature R as shown in FIG. 5, so that a large compressive strain is produced in a cord 46 located at innermost side of the curvature R in the strip 43 to remain as a residual strain. When the cord 46 is nylon cord, if the compressive strain exceeds 25%, there is a fear of promoting the cord fatigue. However, when a ratio of R/SW (R is a radius of curvature (mm)) of the strip 43 at the side ends 44, 45 of the layer, and SW is a width of the strip 43) is not less than 2.0 as shown in FIG. 6, the compressive strain produced in the cord 46 can be controlled to not exceed 25%. Therefore, when the inner belt layer 41 is formed by using the rubberized strip 43 containing plural nylon cords 46 therein, it is preferable that the value of R/SW is not less than 2.0. In addition to the case where the strip 43 is bent at both side ends 44, 45 of the ply in form of an arc as shown in FIG. 5, the strip 43 may have a straight portion extending along the side end 44 (45) and an arc portion located at each end of the straight portion as shown in FIG. 6. Even in the latter case, it is favorable that the value of R/SW in the arc portion is not less than 2.0. Furthermore, when the strip 43 is wound while increasingly overlapping an adjacent strip and simultaneously being bent with a given radius of curvature R at both side ends 44, 45 of the belt layer, a zone 47 of a bent triangle formed by overlapping four strips 43 with each other at up to a full width of the strip as shown in FIG. 7 is repeatedly created in these bent portions or in the vicinity of both side ends 44, 45 of the ply in the circumferential direction as shown in FIG. 5. These strips 43 are overlapped with each other by each forming operation. The width of the overlap changes in accordance with the position in the circumferential direction continuously in the circumferential direction. Moreover, these laminated bent portions 47 turn inward in the axial direction as they are formed outward in the radial direction as shown in FIG. 7 because the widths of the inner belt layers 41 become narrower toward the outside in the radial direction as previously mentioned. In the bent portion 47, the outer end in widthwise direction of the two middle strips 43c sandwiched between upper and lower strips 43a and 43b overlaps with the zone 47 located inward from the middle strips 43c in the radial direction as shown in FIG. 7. When the belt 40 is constructed with these zigzag belt layers 41, the total number of belt layers or plies can be decreased while maintaining total strength but reducing the weight and also the occurrence of standing wave during the running at high speed can be prevented.

The middle layers 39 of the composite belt structure 40 are spirally wound around the radially inner zigzag belt layers 41. As shown in FIG. 7 the spirally wound layer 39 extends completely across the two radially inner belt layers 41 and ends at 39a just inside the end 41a. The cords 46 within each strip 39 extend at an angle of 5 degrees or less relative to the circumferential equatorial plane. As shown, four cords are in each strip. In practice the strips 41, 39, and 42 could be wound using two cords 46 or up to 20 cords 46 in a strip or ribbon having plural cords in the range of 2 to 20 cords within each strip. In the exemplary tire 21 of the size 42×17.0R18 strips 43 having 8 cords per strip 42 were used. The strips 43 had a width $S_W$, $S_W$ being 0.5 inches. It is believed preferable that the strip width $S_W$ should be 1.0 inch or less to facilitate bending to form the zigzag paths of the inner and outer layers 41, 42.

In the most preferred embodiment the layers 41, 39, and 42 are all formed from a continuous strip 43 that simply forms the at least two radially zigzag layers 41 and then continues to form the at least one spirally wound layer 39 and then continues on to form the at least two radially outer layers 42. Alternatively, the spirally wound layers 39 could be formed as a separate layer from a strip 43. This alternative method of construction permits the cords 46 to be of different size or even of different materials from the zigzag layers 41 and 42. The cords 46 in the preferred embodiment were made of 1890 2/2 nylon having a diameter of 1.2 mm (0048 inch). Aramid belt layers having a strength of 1500 denier/three filaments to as high as 3000 denier/three filaments can be used as well as high elongation steel cords. What is believed to be the most important aspect of the invention is the circumferential layer 39 by being placed between the zigzag layers 41 and 42 greatly reduces the circumferential growth of the tire 21 in not only the belt edges 44, 45 but in particular the crown area of the tread 36. The spirally wound circumferential layer 39, by resisting growth in the crown area of the tire, greatly reduces the cut propensity due to foreign object damage and also reduces tread cracking under the grooves. This means the tire's high speed durability is greatly enhanced and its load carrying capacity is even greater. Aircraft tires using multiple layers of only zigzag ribbons on radial plied carcasses showed excellent lateral cornering forces. This is a common problem of radial tires using spiral layers in combination with cut belt layers which show poor cornering or lateral force characteristics. Unfortunately, using all zigzag layered belt layers have poor load and durability issues that are inferior to the more conventional spiral belt layers in combination with cut belt layers.

The belt structure as described above is made by feeding the strip from a spool mounted on a linear slide onto a curved or crowned building drum 10 or mandrel. The crowned building drum 10 has a maximum diameter $D_0$ at the centerplane of a central portion, the central portion extending 50% of the belt width's maximum width W. The crowned drum has a small or minimum diameter $D_i$ in each shoulder portion. Preferably the curvature is such that a smooth or uniform curvature results. As the strip is applied to form a zigzag belt layer the strip is positioned inclined about 15° to 30° across the centerplane and spaced abutting at 0 mm gap or up to a 2.0 mm gap at the centerplane. As the strip extends to the shoulder region the strip overlaps an adjacent strip. The amount of overlap ranges from slightly above 0 mm to 100% of the strip width $S_W$. As further illustrated the cord density X in the central portion as measured at the centerplane in the section identified as $W_C$, $W_C$ being a one inch (25.4 mm) wide area encompassing all the belt layers has approximately 110 cords. In the area adjacent the turnaround point as measured at the axial inner edge of the strip and extending a distance of 1.0 inch (25.4 mm) the cord density increases to greater than X, preferably 10% to 200% of X, as shown to 136% of X or about 150 cords. The increase in cord density is due in part to the building of the belt on a curved building drum and allowing the strips to overlap in the shoulder portions. Assuming the diameter $D_0$ is a maximum of 37.5 inches at the crown for a tire size 42×17.0 R 18, then $D_i$ at the crown will be reduced to achieve the desired overlap and by selecting a proper reduction in curvature, the overlapping of the strips will be increasing as they extend toward the lateral edges. The concept relies on the feature that the distance of the centerplane of the circumference moves $\pi D_O$ while the distance at the shoulder moves $\pi D_i$, the difference in $\pi(D_O-D_i)$ would require the strip 43 to have an excess in length at the shoulder. If the overlap did not occur, the angle of zigzag further adds to the circumferential differences, all of which are absorbed by the creation of the overlap. This uniquely creates a cord 46 density increase at each shoulder portion, dramatically increasing the strength of the tire 21.

As can easily be appreciated, the strength of the belt in the shoulder areas is increased by a very large amount yet the central portion has the advantage of lightweight. In fact the central portion by having the strips gap by as much as 2.0 mm can be made lighter than an abutting arrangement of zigzag layers such that the overall weight of the composite overlapping belt structure can be equal to a non-overlapping belt structure and yet provide substantially better strength and durability performance in the most sensitive shoulder portions of the tire.

Figure 10:
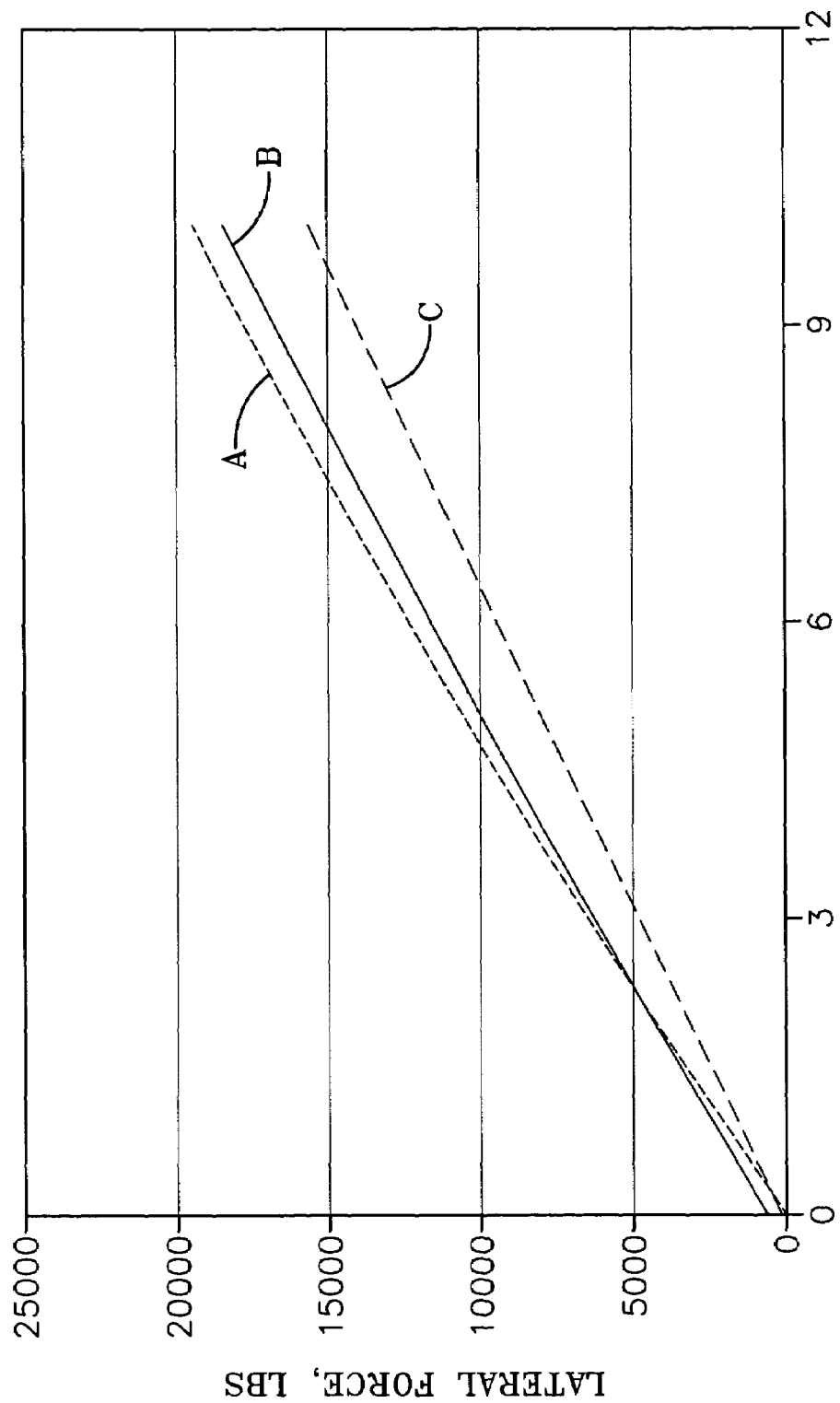
FIG. 10 is a chart showing the lateral force in pounds versus degrees of yaw.

The present invention has greatly improved the durability of the zigzag type belt construction while achieving very good lateral force characteristics as illustrated in FIG. 10. The all zigzag belted tire A is slightly better than the tire B of the present invention which is shown better than the spiral belt with a combination of cut belt layers of tire C in terms of lateral forces. Nevertheless the all zigzag belted tire A cannot carry the required double overload taxi and takeoff test whereas the tire B of the present invention easily meets these dynamic test requirements.

The tire of the present invention may have a nylon overlay 50 directly below the tread. This overlay 50 is used to assist in retreading.

As a further refinement of the present invention when one or more spiral layers 39 are employed the adjacent strips 43 can also be overlapped. Preferably, the overlap is at least greater than 0 to 100%, more preferably about 50% of the strip width 43. As a still further refinement the amount of overlap can be adjusted at any location along the width of the belt 40. By way of example, the overlaps of the spiral layers 39 can be increased at each of the shoulders to achieve a contributory cord density increase of the spiral layers 39 with the zigzag layers 41, 42. An important distinction of the zigzag layers 41,42 achievement of an overlap occurs as a function of the curvature of the crowned drum 10. The changes in overlap of the spiral layer 39 can be achieved on a cylindrical drum or the crown drum 10; however, the linear movement of the feedout spool for the strips 43 needs to be adjusted to create the localized overlap increase or decrease.

What is claimed is:

1. A pneumatic tire having a carcass and a belt reinforcing structure, the belt reinforcing structure comprising:

a zigzag belt structure comprised of a rubberized strip of two or more cords, the strips being inclined at 5 to 30 degrees relative to the centerplane of the tire extending in alternation to turnaround points at each lateral edge, wherein in the crown portion of the tire the zigzag belt structure has two layers of cords, and substantially throughout the shoulder portion of the tire the strips are overlapped wherein each shoulder portion is about 25% of the belt width of the widest belt;

and at least one spirally wound belt layer having cords wound spirally at an inclination of 5 degrees or less relative to the tire's centerplane.

2. The pneumatic tire of claim 1, the belt reinforcing structure further comprising: a second zigzag belt structure, wherein the spiral wound belt layer is positioned between the first and second zigzag belt structures, and the spiral wound belt layer has a width greater than the width of the radially innermost zigzag belt structure.

3. The pneumatic tire of claim 2 further comprising two additional spirally wound layers, wherein all of the spirally wound layers are located between the zigzag belt structures and have a width greater than the width of the radially innermost zigzag belt structure.

4. The pneumatic tire of claim 1 wherein the strips are spaced apart a distance of 0 to 2 mm in a central portion of the belt, which is about 50% of the belt width.

5. The pneumatic tire of claim 1 wherein the width of the spiral layer is greater than the width of the zigzag belt structure.

6. A pneumatic tire having a carcass and a belt reinforcing structure, the belt reinforcing structure comprising:

a zigzag belt structure comprised of a rubberized strip of two or more cords, the strips being inclined at 5 to 30 degrees relative to the centerplane of the tire extending in alternation to turnaround points at each lateral edge, wherein substantially throughout the shoulder portion of the tire the strips are overlapped, wherein the strip overlap distance increases from the center portion to the belt edge; wherein each shoulder portion is about 25% of the belt width of the widest belt; and at least one spirally wound belt layer having cords wound spirally at an inclination of 5 degrees or less relative to the tire's centerplane.

* * * * *